US005926106A

United States Patent [19]

Beran et al.

[11] Patent Number: 5,926,106

[45] Date of Patent: Jul. 20, 1999

[54] ACCESS CONTROL USING SERIAL DISCRETELY CODED RF TRANSMISSIONS INITIATED BY A SINGLE EVENT

[75] Inventors: Mark A. Beran, Niwot, Colo.; Farro Fattahi, Vienna, Va.

[73] Assignee: BC Creations, Inc., Niwot, Colo.

[21] Appl. No.: 08/855,854

[22] Filed: May 12, 1997

[51] Int. Cl.$^{6}$ .......... G06F 7/04

[52] U.S. Cl. .......... 340/825.31; 340/825.34; 327/261; 327/276; 455/126

[58] Field of Search .......... 340/825.31, 825.34, 340/825.57, 825.69; 327/231, 235, 172, 269, 176, 161, 261, 276, 158; 331/179; 332/100; 365/194, 233; 455/126

[56] References Cited

U.S. PATENT DOCUMENTS

| | | | |
|---|---|---|---|
| 4,291,500 | 9/1981 | Reckin et al. . | |
| 4,375,735 | 3/1983 | Rhoads . | |
| 4,376,352 | 3/1983 | Soininen et al. . | |
| 4,669,413 | 6/1987 | Cummins . | |
| 4,847,782 | 7/1989 | Brown, Jr. et al. | 364/492 |
| 5,434,556 | 7/1995 | Donohoo . | |
| 5,528,186 | 6/1996 | Imamura . | |
| 5,534,808 | 7/1996 | Takaki et al. | 327/261 |
| 5,627,528 | 5/1997 | Kuznicki | 340/825.44 |
| 5,751,224 | 5/1998 | Fitzgibbon | 340/825.31 |

OTHER PUBLICATIONS

"Multi–Code" Installation Instructions; Stanley Electronics; Date of Original Publication Unknown. (no month, no date).

*Primary Examiner*—Michael Horabik
*Assistant Examiner*—Jean B. Jeanglaude
*Attorney, Agent, or Firm*—Harold A. Burdick

[57] ABSTRACT

Apparatus and methods for entryway access control using serial discretely coded radio frequency transmissions initiated by a single user access request signal. The control apparatus is battery operated and includes a user actuatable input selectively generating a single electrical initiation signal. Circuitry provides first and second conditioned output signals responsive to receipt of the single electrical initiation signal, the output signals enabling first and second transmission channels, respectively, of an RF transmitter or transmitters. A signal delaying circuit delays output of the second conditioned output signal relative to output of the first conditioned output signal.

20 Claims, 5 Drawing Sheets

ACCESS CONTROL USING SERIAL DISCRETELY CODED RF TRANSMISSIONS INITIATED BY A SINGLE EVENT

FIELD OF THE INVENTION

This invention relates to entryway access controls, and, more particularly, relates to apparatus and methods for control of serial access functions of automatic or power assisted doors, gates and/or electric door and/or gate locks.

BACKGROUND OF THE INVENTION

Entryway access controls for automated actuation of serial access functions as may be necessary for operation of plural doors at airlocks or vestibules, or for operation of normally locked doors, have heretofore required mechanical interconnection of user accessible controllers and entryway actuators (see, for example, U.S. Pat. Nos. 4,375,735, 4,376,352, and 4,291,500). Hard wired electrical systems are also known. Aside from extensive planning and construction requirements inherent in such systems, these controls when used for two door entryways, such as vestibules, are complex and difficult to repair, with hard wired electrical systems generally requiring a minimum of three or four user accessible actuators (such as push plates or the like) for activation of the doors from positions on each side of the vestibule and from within the vestibule.

Wireless systems utilizing radio frequency controllers are also known. Heretofore known and utilized wireless systems have required four push plates (or other actuators) in vestibule deployments because of the RF transmitter coding requirements necessary to assure proper opening sequence of the vestibule doors. Wireless systems, particularly well known for automated garage door operations, have included two channel transmitters with separate actuating buttons for operation of an electrical light, lock, gate, and/or door opening.

Such heretofore known systems have not provided a wireless controller which can initiate serial entryway access functions with only a single user request signal. Such a controller would reduce expense associated with many applications, would allow retrofitting of older applications, and would simplify use. Further improvement could thus be utilized.

SUMMARY OF THE INVENTION

This invention provides apparatus and methods for access control using serial discretely coded radio frequency (RF) transmissions initiated by a single event, such control being particularly well adapted at an entryway having actuating means, for example first and second RF controlled actuators, remotely receiving different RF access control transmissions to initiate required first and second serial accesss control functions (for example, operation of first and second airlock or vestibule doors, gate and door, or electrical door lock and a related door or doors).

The apparatus includes a user actuatable input (passive or active user inputs or switches, for example) for selectively generating a single electrical initiation signal. First and second signal conditioning circuits are connected to receive the single electrical initiation signal and, responsive thereto, provide first and second conditioned output signals coupled with an RF transmission means for enabling first and second transmission channels thereof, respectively. The transmission means differently codes the RF transmissions from the first and second RF transmission channels. An analog circuit at the second signal conditioning circuit delays output of the second conditioned output signal relative to output of the first conditioned output signal.

Delay duration selection at the signal delay circuit is provided for setting signal delay time between output of the first and second conditioned output signals. A switch is associated with the delay duration selection circuitry for selection between first and second signal delay time setting ranges. An override circuit may be provided for receipt of a second user actuated initiation signal and, responsive thereto, providing an RF transmission enabling output signal not subject to output signal delay by the signal delay circuit.

The apparatus is provided with an LED for indicating output status of the first and second conditioned output signals, a switch being connected for selectively disenabling the LED in a power conserving mode. The apparatus is held in a compact housing and is adapted to be connected with a battery maintainable in the housing to provide all needed operational power.

The method of this invention includes the steps of user initiation of a single entryway access request signal responsive to which first and second conditioned electrical output signal are provided. The first conditioned electrical output signal is used to generate a first RF access control transmission to which a first RF controlled actuator, but not a second RF controlled actuator, is responsive. The second electrical output signal is provided only after an established time delay relative to provision of the first conditioned electrical output signal, and is used to generate a second RF access control transmission to which the second RF controlled actuator, but not the first RF controlled actuator, is responsive.

It is therefore an object of this invention to provide apparatus and methods for access control using serial discretely coded RF transmissions initiated by a single event.

It is another object of this invention to provide apparatus and methods for access control using serial discretely coded radio frequency (RF) transmissions initiated by a single event at an entryway having first and second RF controlled actuators for operation of first and second vestibule doors or operation of an electrical door lock and a related door or doors.

It is still another object of this invention to provide low power, battery operated apparatus for entryway access control using serial discretely coded radio frequency (RF) transmissions initiated by a single event.

It is still another object of this invention to provide a controller for operation of RF transmission means having first and second transmission channels communicating at an entryway with RF controlled actuating means remotely receiving different ones of RF access control transmissions from the first and second transmission channels and, responsive thereto, initiating required first and second serial accesss control functions, the controller including user actuatable input means for selectively generating a single electrical initiation signal, first and second signal conditioning means connected to receive the single electrical initiation signal and, responsive thereto, for providing first and second conditioned output signals, means for coupling the first and second conditioned output signals with the RF transmission means for enabling the first and second transmission channels, respectively, and signal delay means at the second signal conditioning means for delaying output of the second conditioned output signal relative co output of the first conditioned output signal.

It is yet another object of this invention to provide an entryway access control for communicating at an entryway with first and second RF controlled actuators remotely receiving different ones of coded RF access control transmissions and, responsive thereto, initiating required first and second serial access control functions, the control including user actuatable input means for selectively generating a single electrical initiation signal, first and second signal conditioning means connected for providing first and second conditioned output signals responsive to generation of the single electrical initiation signal, coding and transmission means having first and second RF transmission channels connected for receiving the first and second conditioned output signals and, responsive thereto, enabling the first and second transmission channels, respectively, for generation of differently coded RF transmissions, signal delay means at the second signal conditioning means for delaying output of the second conditioned output signal relative to output of the first conditioned output signal, and means adapted for coupling the control with a battery to provide all operational power for the control.

It is yet another object of this invention to provide a method for controlling access at an entryway having at least first and second RF controlled actuators for remotely receiving different RF access control transmissions and, responsive thereto, initiating required first and second serial access control functions, the method including the steps of user initiation of a single entryway access request signal, providing a first conditioned electrical output signal responsive to initiation of the single request signal, utilizing the first conditioned electrical output signal to generate a first RF access control transmission to which the first RF controlled actuator, but not the second RF controlled actuator, is responsive, providing, after an established time delay relative to provision of the first conditioned electrical output signal, a second conditioned electrical output signal responsive to initiation of the single request signal, and utilizing the second conditioned electrical output signal to generate a second RF access control transmission to which the second RF controlled actuator, but not the first RF controlled actuator, is responsive.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
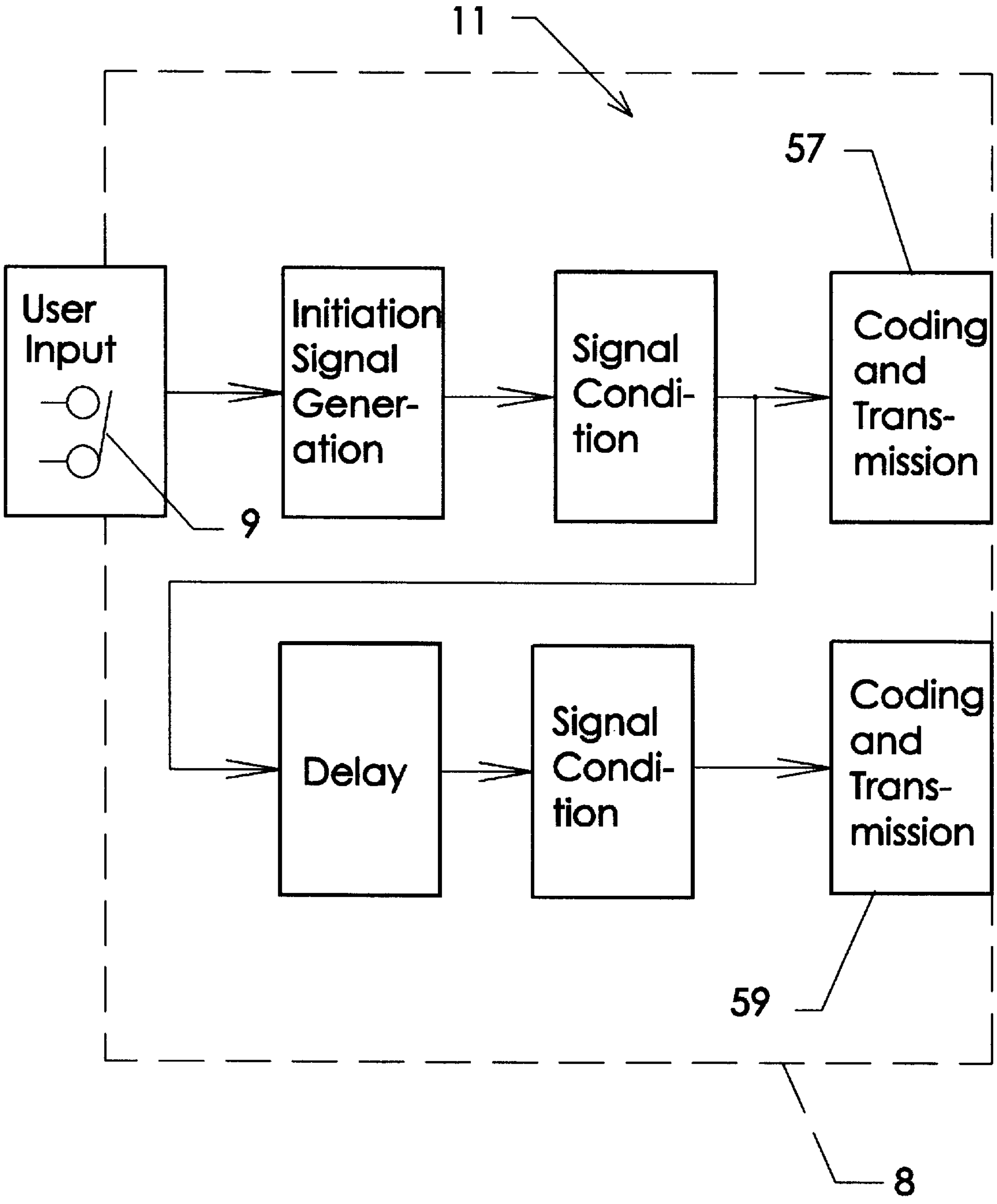
FIG. 1 is a functional flow diagram illustrating operation of the apparatus of this invention.

The apparatus and method of this invention are functionally illustrated in FIG. 1. A user (one attempting to manipulate an entryway, for example, by passage through vestibule or airlock doorways, locking or unlocking the passage or the like) initiates control functions by causing closure of switch 9. Control apparatus 11 is in a ready, or standby, state until an initiation signal is received. Switch closure, generating the initiation signal, may be by passive or active user initiation (i.e., utilizing active devices such as push pads, control mats, badge lock devices, keypad devices or electrified key locks, or passive devices such as motion detectors, light barriers, or security system, fire alarm, central control station or other facilities' output signals).

Switch closure results in activation of the power supply (a 9 volt battery would be sufficient, and generation of a single electrical activation signal. This signal is suitably conditioned (as discussed hereinafter) for output to a first coding and transmission channel module and to a delay circuit. The first transmission module generates a first coded (for recognition by a selected receiving and actuating unit such as an electrical lock or swing door operator) radio frequency (RF) transmission within a few milliseconds of the user request input.

After a preset time delay at the analog delay circuit, an output is generated from the delay circuit, with the output conditioned for use at a second coding and transmission channel module. A second coded (for recognition by a different receiving and actuating unit at the entryway) RF transmission is thus generated (later in time from the first transmission) from the second transmission module.

As indicated by the dashed outline 8 in FIG. 1, the user input, battery, control apparatus arid coding and transmission modules are all maintained in a compact housing (which could be either hand held or structurally mounted). The housing would, for example, comprise a unit having dimensions no greater than about 4" by 4" by 2".

Figure 2:
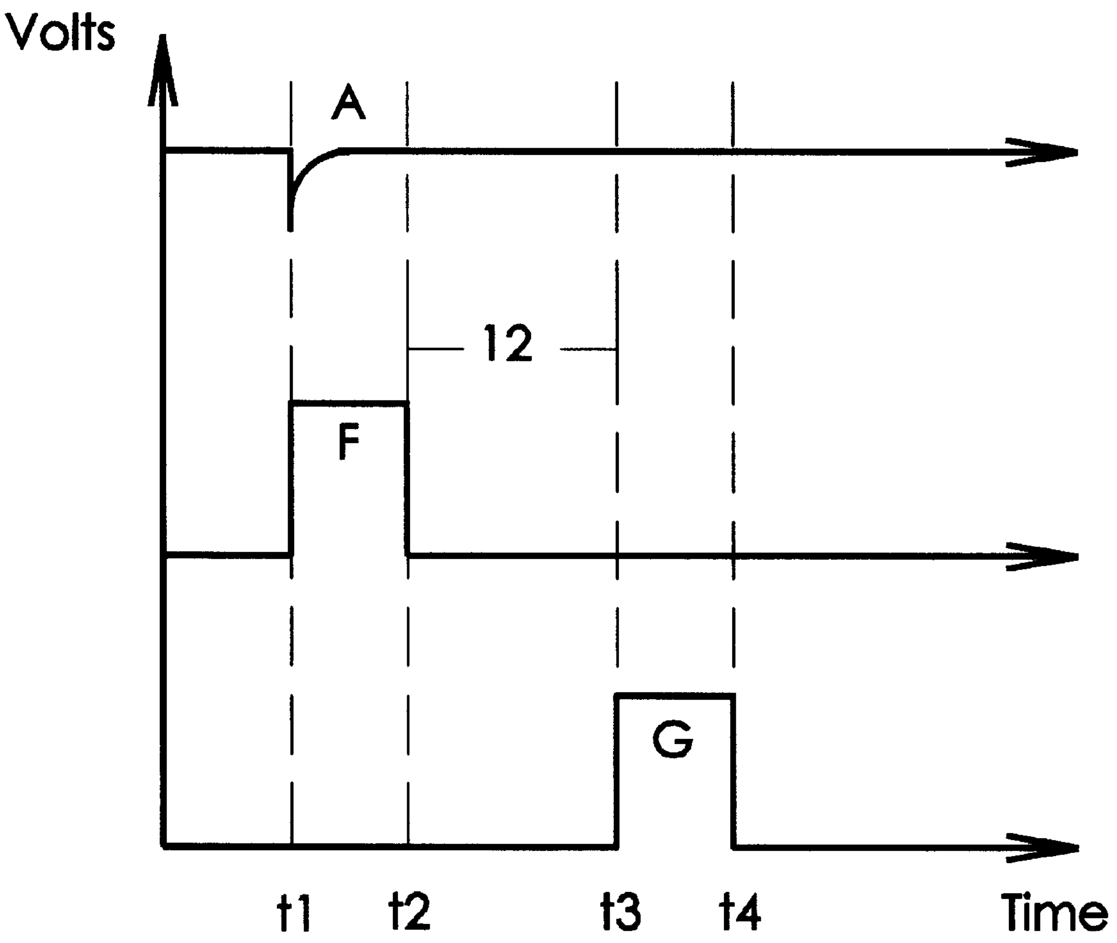
FIG. 2 is a timing diagram illustrating electrical inputs and outputs of the apparatus of this invention.

FIG. 2 illustrates a typical electrical input pulse resulting from closure of switch 9 (i.e., user input), as well as typical control apparatus outputs to the coding and transmission modules. The initiation signal at A is shown as a negative going pulse, the duration of which will depend upon the length of time that the user causes switch activation. The output at F coupled to the first coding and transmission module is a positive square pulse which begins almost simultaneously when the switch is closed. A variable time delay separates the first square pulse from a second square output pulse at G coupled to the second coding and transmission module.

Figure 3:
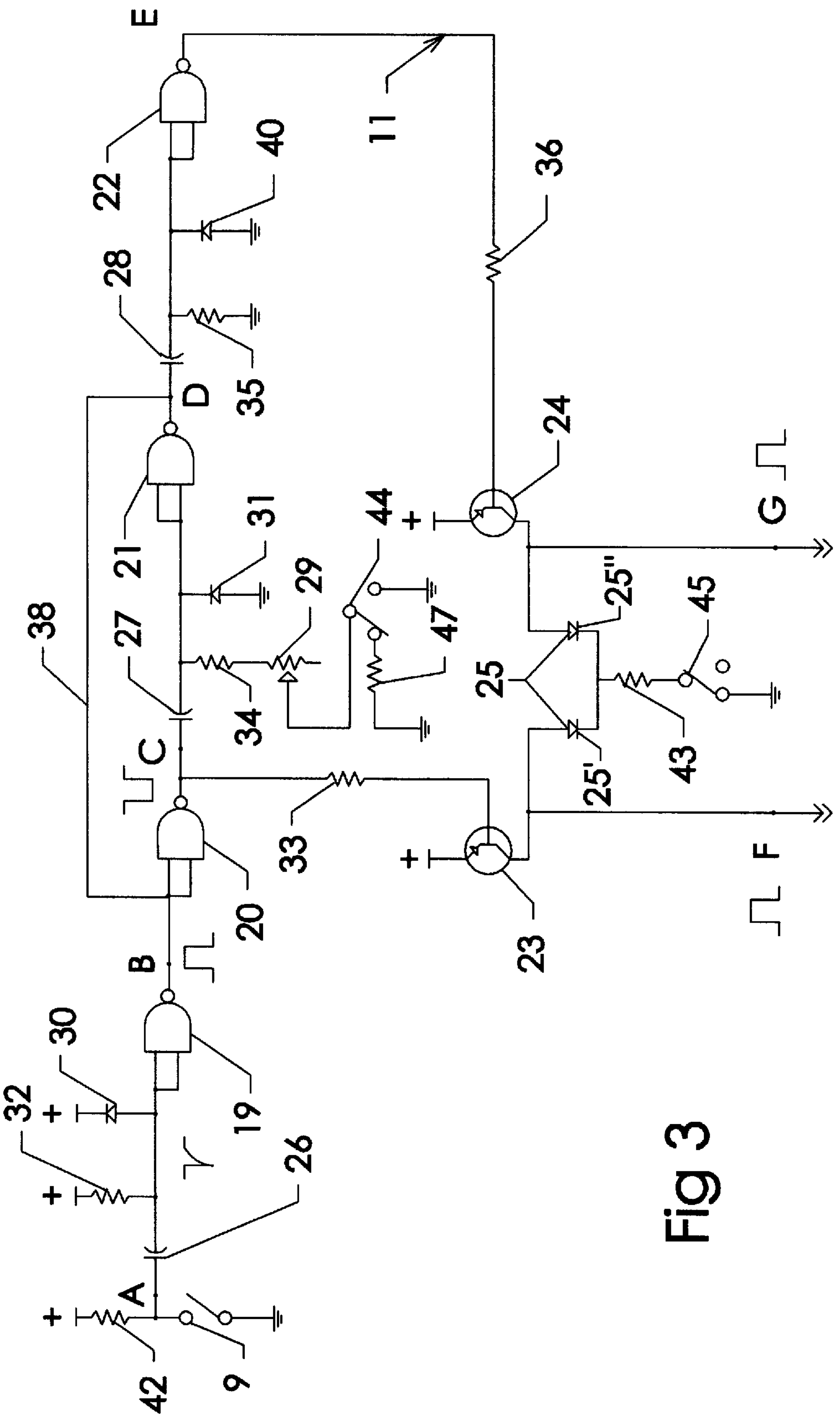
FIG. 3 is as schematic illustration of a first embodiment of this invention.

Turning now to FIG. 3, the preferred embodiment of control apparatus 11 includes a series of NAND gates 19, 20, 21 and 22, preferably of the type which include hysterisis, transistors 23 and 24 (which act as solid state switches), a two color status LED 25, capacitors 26, 27 and 28, adjustment potentiometer 29, voltage surge dissipating diodes 30, 31 and 40, various biasing and timing resistors 32, 33, 34, 35, 36, 42 and 43, activation switch 9, and switches 44 and 45. When switch 9 is closed, the negative going pulse is generated which is differentiated by capacitor 26 and resistor 32 and then presented at both inputs of gate 19. Diode 30 protects gate 19 from voltage spikes when switch 9 opens.

The output of the first gate is shown at B as a positive going square pulse whose width is determined by the values of capacitor 26 and resistor 32. The square pulse at B is inverted by gate 20 (shown at C), provided that the control apparatus is not already generating a low voltage at D (i.e., in time delay). Feedback loop 38 prevents the inversion of the square pulse when the system is in the delay mode. The negative going pulse at C travels through current limiting resistor 33 to provide the bias necessary to switch on PNP transistor 23 which, in turn, lights LED element 25' of LED 25 and sends a suitably conditioned signal to the first coding and transmission module (at coupling point F).

Diode 31 dissipates the negative pulse generated when the voltage at C goes from high to low. The voltage at both inputs to gate 21 goes high at the trailing edge of the inverted square pulse. This causes the output of the gate 21 to go low and remain low until capacitor 27 discharges to the upper threshold voltage of gate 21. Capacitor 28 and resistor 35 shape the input pulse to gate 22 and diode 40 protects the inputs to gate 22. At the end of the selected delay period (as determined by the setting of switch 44 and adjustment potentiometer 29), the positive going pulse edge (at D) initiates the negative going pulse at E which stays low until capacitor 28 discharges through resistor 35 to the upper threshold voltage of gate 22. Together with resistor 36, this provides the negative bias required to switch on PNP transistor 24. The output of transistor 24 drives LED element 25" of LED 25 and provides the properly conditioned, but delayed, signal to the second coding and transmission module (at coupling point G).

Switch 44 allows selection of one of two ranges of time delay to be set at adjustment potentiometer 29 (for example from 0 to 15 seconds when set to ground, or from 15 to 30 seconds when set through resistor 47 to ground). Switch 45 allows LED 25 to be disabled to save power. As thus configured, the system draws less than 1 microamp standby current and operates at a maximum current of 15 milliamps, thus providing a low energy system operable over long periods of battery usage.

Figure 4:
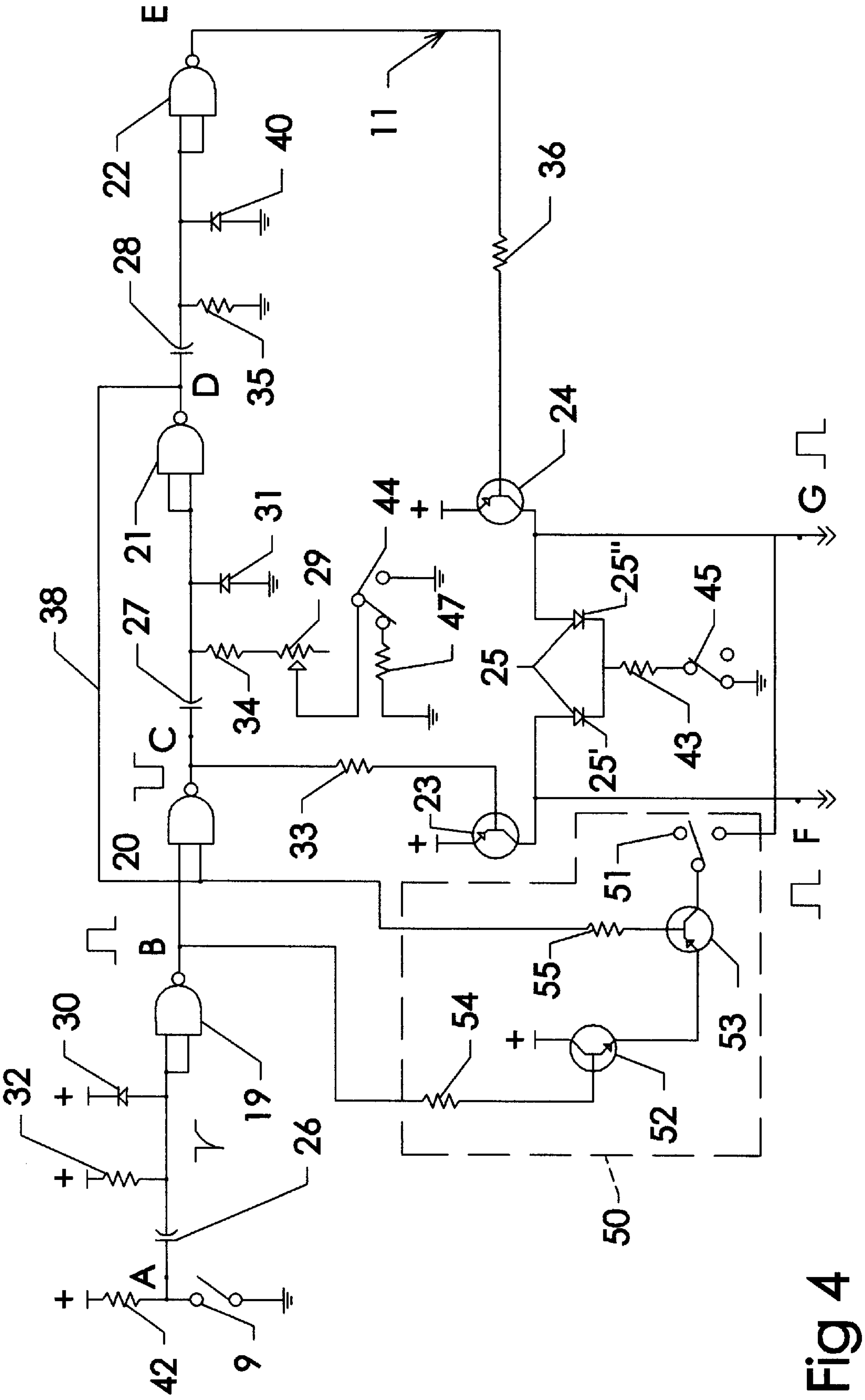
FIG. 4 is a schematic illustration of a second embodiment of this invention.

In some cases it may be advantageous to send an almost immediate activation signal to the second coding and transmission module (while yet preserving the delayed signal to that module). This override function may be accomplished as illustrated in FIG. 4. As shown, the basic circuit configuration is the same as illustrated in FIG. 3, but with the addition of override circuit 50. When delay override is desired, the user causes a second input signal at switch 9 (for example, by again depressing an input push plate or the like).

During the delay period, the voltage at D is low which switches on PNP transistor 53. If a second input pulse is received, the voltage at B goes high which switches on NPN transistor 52. With both transistors switched on, an activation signal is passed to switch 51. Switch 51 (for example, a pcb board jumper) in one position directs the signal from circuit 50 to the second output channel (and thus to the second transmission module). In the other position, second input signals are merely redundant.

Figure 5:
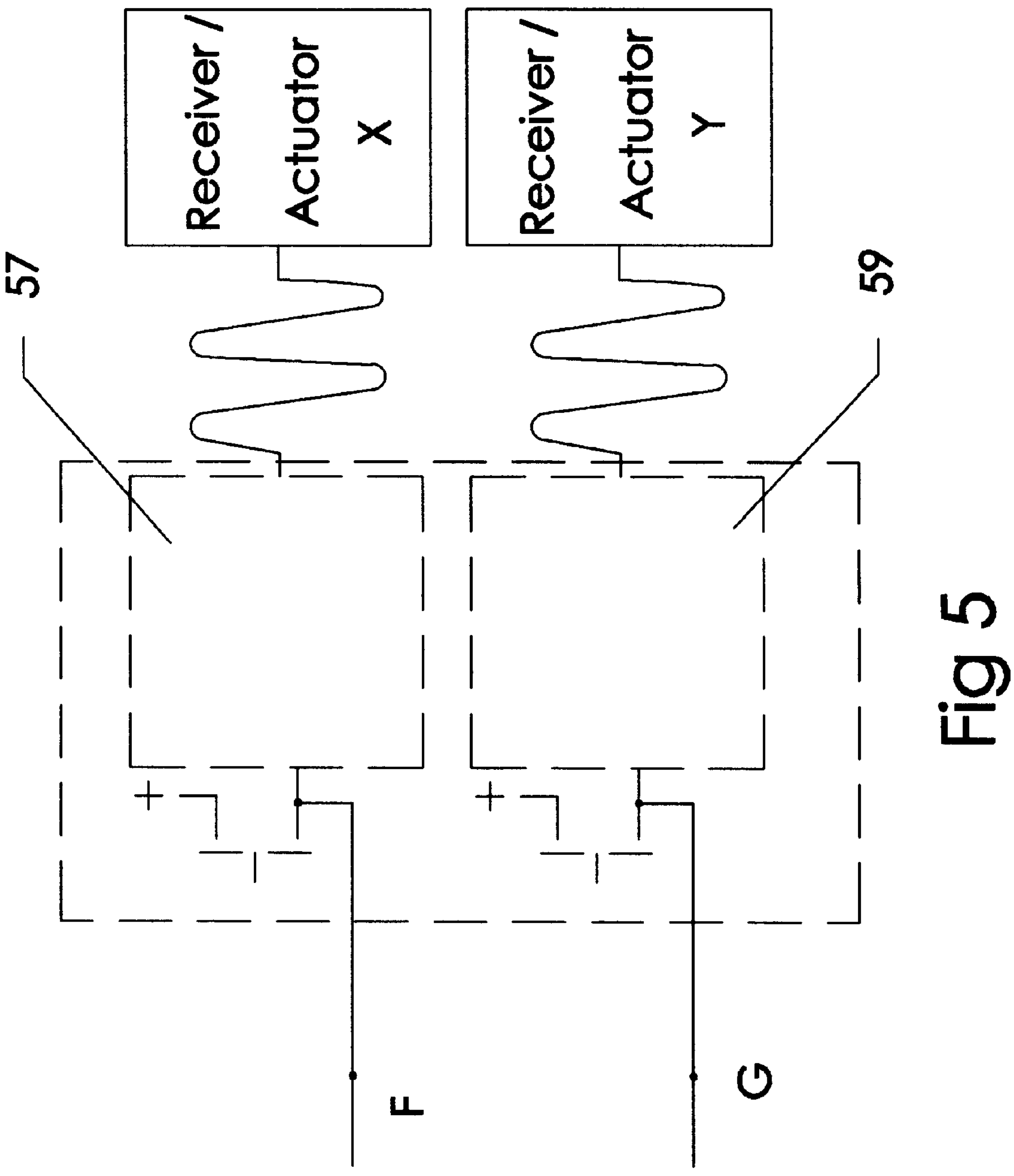
FIG. 5 is a block diagram of the radio frequency transmission and coded output stage in accord with this invention.

As illustrated in FIG. 5, the outputs at F and G are coupled to the coding and transmission modules 57 and 59. As indicated by the dashed lines, these modules may be either separate single channel devices or a single two channel device. In either case, such devices are well known in the art (a 4120 two channel transmitter by MULTI-CODE, INC. could, for example, be utilized in the apparatus of this invention).

Such RF transmitters (and their mated receivers) operate in a narrow frequency band of approximately 300 megahertz. In different countries different frequencies are used. Because they operate in such a narrow band, there must be a means to distinguish one signal from another even though the carrier frequency is essentially the same (and particularly so in applications provided for by this invention, where multiple receiving units are found in close proximity to one another). While coding of signals could be accomplished by focussed frequency output and receiver responsiveness, perhaps the most common means to code signals is by segmenting each transmission into repeating patterns of on/off pulses.

For example, known coding and transmission modules which may be utilized with this invention employ ten position DIP switches which may be preset to provide a unique pattern of pulses in the output ($2^{10}$ possible transmission codes are possible). Communication and response is thereby limited to a receiving unit (for example, an RF receiver with a relay output to generate an activation signal) having DIP switch settings selected for receipt of the coded transmission from the selected transmitter. Of course, this invention may also be utilized for applications where time delayed, but identical coded signals, are transmitted (to only one receiver or separate receivers).

As may be appreciated from the foregoing, this invention provides apparatus and method for single event input, serial actuation of entryway access functions such as may be required for vestibule, airlock, gate, door, door lock or other entryway applications.

What is claimed is:

1. A controller for operation of RF transmitting means having first and second transmission channels communicating at an entryway with RF controlled actuating means remotely receiving different ones of RF access control transmissions from the first and second transmission channels and, responsive thereto, initiating required first and second serial accesss control functions, said controller comprising:

user actuatable input means for selectively generating a single electrical initiation signal;

first and second signal conditioning means connected to receive said single electrical initiation signal and, responsive thereto, for providing first and second conditioned output signals;

first and second means for coupling said first and second conditioned output signals with the RF transmission means for enabling the first and second transmitting channels, respectively; and signal delay means at said second signal conditioning means for delaying output of said second conditioned output signal relative to output of said first conditioned output signal.

2. The controller of claim 1 further comprising a compact housing for housing said controller and the transmitting means, and means for coupling said controller with a battery maintainable in said housing to provide all needed operational power.

3. The controller of claim 1 further comprising delay duration selection means connected with said signal delay means for setting signal delay time between output of said first and second conditioned output signals.

4. The controller of claim 3 further comprising switching means associated with said delay duration selection means and switchable for selection between first and second signal delay time setting ranges.

5. The controller of claim 1 further comprising status indicating means for indicating output of said first and second conditioned output signals, and switching means connected for selectively disenabling said status indicating means in a power conserving mode.

6. The controller of claim 1 wherein said signal delay means is an analog signal delaying circuit.

7. The controller of claim 1 further comprising an override circuit connected between said input means and said coupling means for receipt of a second user actuated initiation signal and, responsive thereto, providing an RF transmission enabling output signal not subject to output signal delay by said signal delay means.

8. An entryway access control for communicating at an entryway with first and second RF controlled actuators remotely receiving different ones of coded RF access control transmissions and, responsive thereto, initiating required first and second serial accesss control functions, said control comprising:

user actuatable input means for selectively generating a single electrical initiation signal;

first and second signal conditioning means connected for providing discrete first and second conditioned output signals responsive to generation of said single electrical initiation signal;

coding and transmission means having first and second RF transmission channels connected for receiving said first and second conditioned output signals and, responsive thereto, enabling said first and second transmission channels, respectively, for generation of differently coded RF transmissions;

signal delay means at said second signal conditioning means for delaying output of said second conditioned output signal relative to output of said first conditioned output signal; and means adapted for coupling said control with a battery to provide all operational power for said control.

9. The control of claim 8 further comprising delay duration selection means connected with said signal delay means for setting signal delay time between output of said first and second conditioned output signals.

10. The control of claim 8 wherein said coding and transmission means generates coded transmissions of essentially only one frequency.

11. The control of claim 8 further comprising an override circuit connected between said input means and said coding and transmission means for receipt of a second user actuated initiation signal and, responsive thereto, providing an RF transmission enabling output signal not subject to output signal delay by said signal delay means.

12. The control of claim 8 wherein said coding and transmission means includes either first and second single channel transmitters providing said first and second RF transmission channels or a two channel transmitter providing said first and second RF transmission channels.

13. The control of claim 8 wherein said signal delay means is an analog signal delaying circuit.

14. A method for controlling access at an entryway having at least first and second RF controlled actuators for remotely receiving different RF access control transmissions and, responsive thereto, initiating required first and second serial access control functions, said method comprising the steps of:

user initiation of a single entryway access request signal;

providing a first conditioned electrical output signal responsive to initiation of said single request signal;

utilizing said first conditioned electrical output signal to generate a first RF access control transmission to which the first RF controlled actuator, but not the second RF controlled actuator, is responsive;

providing, after an established time delay relative to provision of said first conditioned electrical output signal, a discrete second conditioned electrical output signal responsive to initiation of said single request signal; and utilizing said second conditioned electrical output signal to generate a second RF access control transmission to which the second RF controlled actuator, but not the first RF controlled actuator, is responsive.

15. The method of claim 14 wherein said first and second serial access control functions are operation of first and second vestibule or airlock doors, respectively.

16. The method of claim 14 wherein said first and second serial access control functions are operation of one of an electrical door lock and gate and operation of a related door.

17. The method of claim 14 further comprising the steps of:

selective user initiation of a second entryway access request signal after initiation of said single request signal;

providing an override electrical output signal responsive to initiation of said second request signal that is not subject to said established time delay; and utilizing said override electrical output signal to generate an RF access control transmission to which the second RF controlled actuator, but not the first RF controlled actuator, is responsive.

18. The method of claim 14 further comprising utilizing battery power for generation of all said access request signals, said electrical output signals, and said RF access control transmissions.

19. The method of claim 14 further comprising differently coding said first and second RF access control transmissions and generating said first and second RF access control transmissions at the same frequency.

20. The method of claim 14 further comprising the step of selecting and setting said established time delay from a range of available time delay.

* * * * *